United States Patent
Kohler et al.

[15] 3,658,032
[45] Apr. 25, 1972

[54] REACTOR FOR THE FORMATION OF MATERIAL ON A SUBSTRATE

[72] Inventors: Willem A. Kohler, Los Gatos; Joseph A. Flood, Mountain View, both of Calif.

[73] Assignee: Fairchild Camera and Instrument Corporation, Syosset, Long Island, N.Y.

[22] Filed: Nov. 5, 1970

[21] Appl. No.: 87,315

Related U.S. Application Data

[63] Continuation of Ser. No. 757,874, Sept. 6, 1968, abandoned.

[52] U.S. Cl. ..............................................118/48, 219/398
[51] Int. Cl. ...................................................C23c 13/08
[58] Field of Search ..................................118/48–49.5, 64, 118/65, 620; 117/119.6, 107.1, 107.2; 148/174, 175; 219/388, 338, 385, 347, 391, 316, 395–398

[56] References Cited

UNITED STATES PATENTS

| | | | |
|---|---|---|---|
| 2,369,561 | 2/1945 | Grisdale...................................118/48 |
| 2,674,809 | 4/1954 | Meinhoffer....................219/388 UX |
| 2,828,225 | 3/1958 | Goetzel et al..................118/49.1 UX |
| 3,190,262 | 6/1965 | Bakish et al. ............................118/48 |
| 3,343,518 | 9/1967 | Westeren et al......................118/49.5 |
| 3,473,510 | 10/1969 | Sheng et al. ..........................118/49.5 |

*Primary Examiner*—Morris Kaplan
*Attorney*—Roger S. Borovoy and Alan H. MacPherson

[57] ABSTRACT

A reactor for the formation of material on a substrate has a reactor tube with a bottom that is heated by a heating element that does not substantially increase the temperature of the remainder of the tube.

4 Claims, 2 Drawing Figures

PATENTED APR 25 1972

3,658,032

WILLEM A. KOHLER
JOSEPH A. FLOOD
INVENTORS

BY
ATTORNEYS

REACTOR FOR THE FORMATION OF MATERIAL ON A SUBSTRATE

This application is a continuation of application Ser. No. 757,874, filed Sept. 6, 1968 and now abandoned.

BACKGROUND OF THE INVENTION

1. Prior Art

In the semiconductor art, growing semiconductor material (e.g., silicon) onto a substrate is a well-known process. This process is most commonly performed in what is referred to as a radio (or high) frequency (RF) reactor. Such reactors employ a non-conductive reactor tube surrounded in part by an RF coil that is energized by a source, such as an RF generator. Within the reactor tube is a boat of an electrically conductive material for holding the substrate. The RF coil creates an electromagnetic field that interacts with the conductive boat to heat both it and the substrates thereon while the walls of the reactor tube remain relatively cool compared to the boat. The substrate is heated to a temperature sufficiently high to cause gases passing through the reactor tube in the proximity of the substrate to decompose, or to react with other gases within the tube or both, and form a semiconductor material on the substrate. A typical example for epitaxial silicon growth is the overall reaction $SiCl_4 + 2H_2 \rightarrow Si + 4HCl$. For the deposition of a typical dielectric film, such as silicon nitride, a typical reaction is $3SiCl_4 + 4NH_3 \rightarrow Si_3N_4 + 12HCl$. Also very commonly used is silane, $SiH_4$, instead of silicon tetrachloride in the above mentioned reactions.

Because the RF reactor is designed so that the reactor walls surrounding the boat are of an electrically nonconductive material, and remain relatively cool while the boat itself is heated, this reactor has certain advantages for which it has been widely accepted in the semiconductor industry. However, such a rector also has drawbacks.

First, the RF coil, along with its energy source (such as an RF generator) and elaborate apparatus to provide cooling (such as a water-cooled jacket and an extensive system of cooling coils) is expensive both to install and to operate. For example, the installation cost often exceeds $50,000. Moreover, because of the large power loss associated with inductive RF-type heating, the reactor is inefficient, requiring approximately 130 to 175 kilowatts of input power to operate the RF generator, which induces only about 30 to 50 kilowatts of power in the RF coil.

Second, the field developed by the RF coils is not uniform over the length and width of the reactor and is particularly nonuniform across the width of the boat holding one or more substrates. Consequently, the semiconductor substrates are not uniformly heated. This nonuniform heating results in the nonuniform deposition of material upon the substrates, which is particularly undesirable in the fabrication of solid-state device such as transistors, diodes and integrated circuits. In such devices, small thickness variations of deposited material in the micron or even angstrom range can cause significant variations in device operating characteristics.

In addition, the reproducibility of the results obtained from the RF-type reactor in solid-state device applications has not been satisfactory. More particularly, it has been observed that the electrical characteristics of material formed using an RF reactor can vary in accordance with the location of the substrate on the boat. One solution to the reproducibility problem has been to limit the useable length of the reactor tube to specific dimensions. This approach, however, further restricts the potential efficiency of a particular reactor.

Another type of reactor used in the semiconductor industry is the hot-tube furnace. Here, heating elements surround a quartz tube within which is placed a boat for carrying substrates. The tube is heated from all sides and consequently the boat is similarly heated to a temperature high enough to cause decomposition of gases flowing within the tube. This method eliminates the expensive equipment needed by the RF reactor, and does not have the loss in efficiency associated with inductive heating. However, it is considered unsatisfactory because the walls of the reactor tube are heated above the temperature of decomposition of gases passing through the tube, so that unwanted deposits form on the tube wall, due to a chemical reaction that occurs when the gases pass over the hot walls. Also, unwanted impurities from the heating element diffuse through the hot quartz wall and are added to the material deposited onto the substrates, thereby detrimentally affecting the operating quality of subsequent devices comprising the substrates.

SUMMARY OF THE INVENTION

This invention overcomes many of the problems of the prior art reactors. The reactor of this invention produces a more uniform temperature gradient throughout the boat than the prior art RF reactors and eliminates both undesired deposits along the reactor tube walls and unwanted impurities in the deposited material, a major problem with the hot-tube furnace. In addition, the reactor of this invention is inexpensive, possessing a typical installation cost of about $2,500. Furthermore, by using a resistance-type heating, the reactor of this invention is both highly efficient and operates with an input-power requirement of only about 2 kilowatts, which is 1 to 2 percent of the power required by RF-type reactors. Finally, the reactor of this invention produces a smaller temperature gradient between the middle and outer portions across the boat compared to the temperature gradient produced by the prior art RF reactors. As a result, differences in characteristics between material deposited on substrates on the same boat are reduced.

In accordance with this invention, a reactor tube is provided with both a curved top portion and a flat bottom portion adapted for holding a flat support upon which semiconductor substrates are placed. Inlets for permitting gases to flow into the reactor tube and an outlet for permitting the gases to leave the reactor tube are placed on the ends of the tube. Beneath the bottom portion of the tube is placed a segmented heating unit containing a plurality of electrically isolated, individually controlled heating elements. These heating elements rest on a contoured insulating support.

Upon applying power to the heating elements, the flat bottom of the tube becomes heated and in turn heats the substrates on the boat resting on this bottom. However, because the tube wall is further away from the heating elements than the bottom portion, and because of the cooling effect of the flowing gases, the wall remains relatively cool compared to the bottom portion and the boat resting thereon. Consequently, decomposition of the gases, or a reaction therebetween, or both, takes places only in the vicinity of the boat and thus little, if any, deposit is formed on the tube wall. Also, the cooler wall prevents impurities from diffusing therethrough onto the substrates.

Furthermore, the boat fully covers the heated bottom portion, thereby preventing the possibility of any impurities from the heated bottom being formed onto the substrates carried by the boat. However, few, if any, impurities ever collect at the bottom portion, because the heating elements underneath the bottom are imbedded in an insulating material, which reduces the possibility of any impurities moving between the heating elements and the bottom portion, and because the presence of the boat itself overlying the bottom prevents deposition from above onto the bottom portion. Each of the heating elements can be individually adjusted so that the temperature gradients appearing along the axis of the tube can be precisely controlled to obtain a desired profile.

This invention will be more fully understood in light of the following detailed description taken together with the drawings.

DETAILED DESCRIPTION OF THE DRAWING

Figures 1, 2:
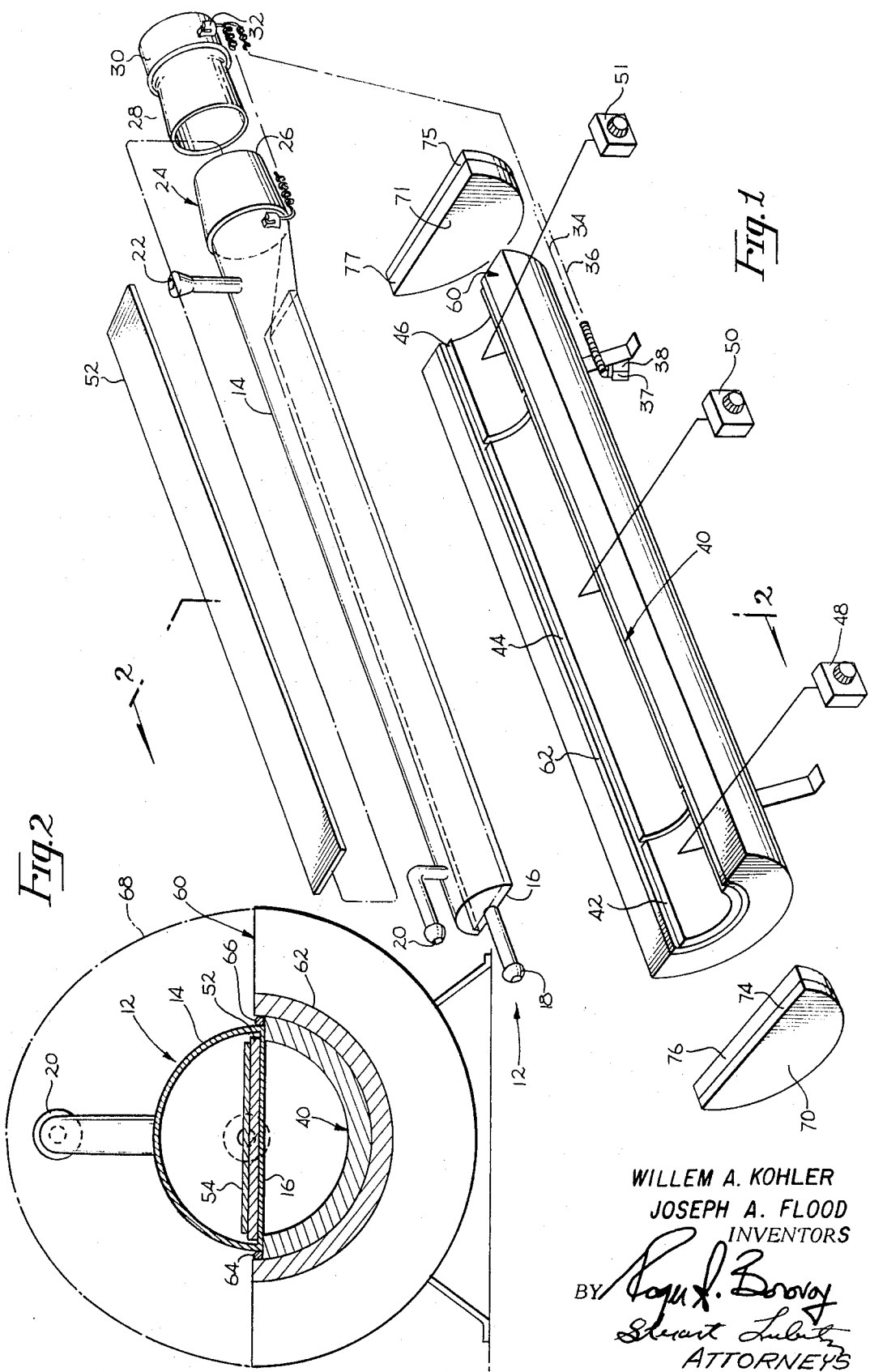
FIG. 1 is an exploded perspective of the reactor.
FIG. 2 is a sectional view taken along the lines 2—2 of FIG. 1 with the components in an assembled relationship.

The reactor comprises a reactor tube 12, a heating unit 40, and housing 60. The reactor tube 12 has a tubular portion 14 with a flat bottom 16, a plurality of inlets 18 and 20 for the entry of gases into the tubular portion 14 and a outlet 22 for the exiting of gases from the tubular portion 14. The tubular portion 14 is curved in cross section, shown in FIG. 2 as semicircular, with bottom 16 bridging the cross section in a substantially diametrical or chord relationship. However, for some applications, portion 14 may be rectangular in shape. Typically, tubular portion 14 has a length of approximately 26 inches and an outside diameter of approximately 2½ inches.

At one end of tubular portion 14 is a tapered section 24 having an open end 26 adapted to receive end cap 28 having a plurality of ears 30 and 32 for receiving a plurality of springs 34 and 36 attached at their other ends to microswitches 37 and 38, which in turn control safety relays on a control panel (not shown). Microswitches 37 and 38 are operated when the pressure conditions in the reactor tube are too high or end cap 28 is displaced. The switches 37 and 38 will then cause safety circuits to be energized to prevent the flowing of all gases except an inert gas, such as $N_2$, through the inlets. Switches 37 and 38 also set off an alarm unless the end cap is properly seated to seal the reactor tube during the operating condition. The opening 26 is necessary to permit the insertion of a member 52 (commonly referred to as a boat) that is adapted to receive substrates 54 spaced along the entire length of boat 52. The width of substrate 54 is only limited by the width of the boat 52. In a typical case of an approximately 2½ inch wide boat, the substrate may be up to approximately 2¼ inches wide. The boat 52 comprises a material that is heat conductive, has a low vapor pressure at high temperature, is chemically inert, and is nondegassing. For example, a suitable boat material comprises graphite coated with silicon or silicon carbide. The boat 52 has a width dimension that is only slightly less than that of flat portion 16 so that flat portion 16 is covered and little, if any, growth or deposit occurs along its length. The boat 52 may experience some growth or deposit thereon but such growth is removable.

Heating unit 40 is located below flat portion 16 and is formed by a plurality of resistance heating elements, such as elements 42, 44 and 46. Each heating element is connected to a separate and independently controlled power source, for example, power sources 48, 50 and 51, which are of a type well known in the art and can be thermo-couple controlled with manually adjustable settings. This feature enables each of the heating elements 42, 44 and 46 to be separately controlled at different temperatures, and permits one selectively to vary the temperature profile along the length of the boat. Also it is within the scope of the invention to change the number of individually controlled heating elements, thereby providing great flexibility in selecting the desired temperature profile. The heating elements 42, 44 and 46 together have an overall length that is substantially identical in length with that of boat 52. Preferably the heating elements 42, 44 and 46 are resistance heating elements (such as Kanthal) embedded in an insulating and holding material 40, such as asbestos cement or equivalent material.

The heating elements 42, 44, and 46 having a curved cross section, shown in FIG. 2 as semicircular. Also, the flat bottom portion 16 of tube 12 is in diametrical or chord-like relationship to the curved cross section of the heating elements 42, 44, and 46. This relationship enables flat portion 16 to be heated at a substantially uniform temperature while the tubular portion 14 is maintained at a substantially lower temperature. It should be noted that the relative arrangement of the curved tubular portion 14, the flat bottom 16 and the curved heating unit 40, provides a very effective thermo dynamic balance whereby the flat portion 16 may be maintained at a precisely controlled temperature profile, uniform across its width.

More specifically, heat losses such as losses due to radiation or convection or both, are more likely to occur along the edges than in the center of the boat 52. However, because the edges of boat 52 are closer to the curved heating unit 40 compared to the center of boat 52, more intense heat is applied at the edges than at the center, thereby compensating for any heat losses along the edges. Also, because the curved portion 14 of tube 12 is farther from the heating unit 40 than the flat bottom 16 and because of the cooling effect of gases flowing through the tube 12, the curved portion 14 is kept at a substantially lower temperature than that of the flat bottom 16. Also, the heating elements 42 and 46 may be individually adjusted to vary the heat applied to the ends of the boat 54 compared to the heat applied to the middle of the boat by heating element 44. The curved cross section of tubular portion 14 and heating unit 40 is shown as semicircular, because this is a particularly convenient shape for ease of manufacturing, and also because with respect to the heating unit 40, this shape provides a particularly uniform temperature distribution. However, other curved shapes may be used, depending upon a particular application. Further, the selected shape of curved tubular portion 14 may be different from that of heating unit 40, without departing from the scope of the invention.

The heating unit 40 along with reactor tube 12 are positioned in housing 60 by an insulator lining 62 having a curved cross section in conformity with heating unit 40. A pair of spacers 64 and 66 position the reactor tube 12 with respect to the lining 62. A cover 68, only part of which is shown, encloses the unit.

The ends 70 and 71 of the reactor consist of transite plates 74 and 75 approximately ½ inch thick, and thick fire bricks 76 and 77 approximately 1 inch thick. Although shown as separate pieces in the exploded drawing of FIG. 1, the ends 70 and 71 are in fact an integrated part of the reactor wherein the latter has a flat surface at both ends.

In operation, taking a typical case for the deposition of silicon nitride ($Si_3N_4$), gases such as silane ($SiH_4$) or silicon tetrachloride ($SiCl_4$) are supplied to inlet 18 along with a carrier gas such as hydrogen ($H_2$) or nitrogen ($N_2$). When employing silane, a typical flow rate is 24 cubic centimeters per minute of silane with hydrogen ($H_2$) as the carrier gas being delivered at the rate of 10 liters per minute. The other inlet 20 is also supplied with one of the reaction gases such an ammonia ($NH_3$) which when employing silane and hydrogen at the rates indicated, is typically supplied at a rate of 24 cubic centimeters per minute.

Prior to the entry of the reacting gasses through inlets 18 and 20, the resistance heating elements 42, 44 and 46 are energized by power sources 48, 50 and 51 which have been set to maintain the desired temperature. In the case of silicon nitride deposition with silane, this temperature would be approximately 710° C. With respect to silicon tetrachloride, at a temperature of approximately 850° C. is necessary. With the heating elements energized, the boat 52 and substrates 54 thereon are heated to a temperature sufficient to cause the gases flowing thereover to decompose, interact, and form a deposit on the substrate. For example, silane can react with ammonia to form a deposit of silicon nitride. Because the tubular portion 14 is farther away from the heating unit 40 than flat bottom 16 and because of the cooling effect of the flowing gases, the tubular portion 14 remains at a temperature lower than the temperature of decomposition of the gases, and thus there is little, if any, deposit on portion 14. The excess gases and reaction products exit via outlet 22.

In summary, the reactor of this invention eliminates the need for a complicated RF generator, RF coil, and cooling mechanism. The reactor has an installation cost that is more than an order of magnitude less than that of the presently available RF-type reactors. The main flow rate of the gases employed in this reactor may be one third of that employed in an RF reactor of the same capacity. Because of both the unique location of the curved heating elements relative to the flat reactor bottom and the use of a plurality of individually controlled heating elements, the resulting deposition of material on the substrates is of substantially uniform thickness and may be readily reproduced.

The reactor of the invention has a wide range of applications to semiconductor materials and it has been proven particularly effective with respect to the deposition of silicon nitride and epitaxial silicon. For example, the material that can be deposited onto substrates within the reactor may be of single crystalline, polycrystalline, or amorphous structure, depending upon such considerations as the gases used, the growth parameters such as flow rate and boat temperature, the type of material deposited, and the surface condition of the substrate itself.

For single crystalline growth, semiconductor material such as silicon, germanium, gallium arsenide, and others can be epitaxially grown on single crystalline semiconductor substrates, or, in special cases, on single crystalline or amorphous insulating substrates, such as silicon dioxide and aluminum oxide with or without a coating (e.g., a 2,000 A. film of tantalum).

For polycrystalline and amorphous growth, on the other hand, the above mentioned semiconductor materials, and insulating materials (such as silicon-nitride, aluminum-oxide, or silicon dioxide) can be deposited on a very wide range of single crystalline, polycrystalline, or amorphous substrates of semiconducting, insulating, or metallic material. Examples of semiconducting substrates comprise silicon, germanium, and gallium arsenide. Examples of insulating substrates comprise silicon dioxide, germanium dioxide, and aluminum oxide. Examples of metallic substrates comprise molybdenum and tantalum. The substrate may also comprise a combination of the above mentioned materials. Also, the substrates may comprise one or more of the above mentioned materials with a film, or more than one film, deposited over it.

Further, using organic vapors, insulating films can be deposited by thermal polymerization. Moreover, metals can be deposited onto substrates within this reactor by using pyrolytic decomposition of metal organic vapors or by the reduction of vapors of inorganic compounds.

What is claimed is:

1. A reactor for controlling the location of the decomposition or reaction of gases therein in order to form selected material on the surface of semiconductor substrates located at the flat bottom portion of the reactor tube but not on the curved top portion without the need of a cooling unit, while providing protection from alkali ion contamination, the reactor comprising:

a reactor tube of generally semicircular cross section and having a curved top portion and a flat bottom portion;

a member adapted to support semiconductor substrates located upon said flat bottom portion, the member being almost as wide as the flat portion;

inlet means for enabling gases to flow selectively into said reactor tube and outlet means for enabling gases to flow out of said reactor tube; and sealing means for keeping said reactor tube gas tight during operation, except for gas flowing in said inlet and outlet means;

a plurality of individually controlled resistance heating members adapted to establish a temperature gradient along the longitudinal axis of said reactor and located beneath said bottom portion for selectively heating said bottom portion and said member but not said top portion so that said member is heated to a relatively high temperature, while said top portion remains at a relatively low temperature and gases flowing through said reactor tube decompose or react or both at said member but not along said top portion and selected material is formed upon the surface of the substrates but not upon said top portion; and each said heating member having an upwardly directed, open ended, semicircular cross section and supporting said flat bottom portion of the reactor on said open end.

2. The reactor of claim 1 wherein said heating elements comprise filaments embedded in insulating material.

3. The reactor of claim 2 wherein said insulating material comprises asbestos.

4. The reactor of claim 1 wherein said member comprises graphite.

* * * * *